Feb. 20, 1968  R. E. KLAUSS ET AL  3,369,449

WEB DRIVING MECHANISM

Filed April 12, 1965

RALPH E. KLAUSS
MICHAEL A. PETRANTO
INVENTORS

BY R. Frank Smith
David R. Ogden

ATTORNEYS 3,369,449
WEB DRIVING MECHANISM
Ralph E. Klauss and Michael A. Petranto, Rochester, N.Y., assignors to Eastman Kodak Company, Rochester, N.Y., a corporation of New Jersey
Filed Apr. 12, 1965, Ser. No. 447,386
13 Claims. (Cl. 88—24)

The present invention relates to a web driving mechanism and more particularly to a web drive arrangement in a photographic projection printer wherein the increments of film movement require continuous surveillance and frequent adjustment.

Many partially automatic photographic projection printers are known which expose a photosensitive printing paper web with a plurality of images by moving both the film strip and the web and by sequentially passing light through negative images of the film strip comprising several strips of film secured together. However, since several different cameras, even those of the same nominal size, tend to have slightly different framing apertures, driving mechanisms, and framing controls, it often occurs that the edges of the several images are not an equal distance apart. Thus it has been the practice in projection printers to adjust the position of the negatives in a printing aperture to match the masking frame directly to the image just prior to each printing operation. Also it is usually necessary to classify the image prior to exposure to allow correction of exposure intensity and color. The prior art machines are therefore relatively slow in operation compared to the ability of the mechanism itself to expose individual frames and advance the film strip and paper web.

Therefore, an object of the present invention is to provide an improved arrangement for a photographic projection printer film drive mechanism.

In accordance with one embodiment of our invention the trailing edge of a negative frame on a film strip next to be aligned in a printing aperture is detected by a pointer mechanism spaced from the print framing aperture by one frame. At the same time, the print is classified as to color and intensity. The pointer is controllingly coupled to the driving rollers of the film strip. Thus, by proper positioning of the pointer, the rollers are preset to advance the film strip an amount which will properly position it in the framing aperture. If several images of identical size are equally spaced on a particular portion of a film strip, practically no positioning adjustment is required. Moreover, any required positioning adjustment or intensity correction is accomplished while a preceding image frame is being printed so as not to delay the printing cycle.

The subject matter which is regarded as our invention is particularly pointed out and distinctly claimed in a concluding portion of this specification. The invention, however, as to its organization and operation, together with further objects and advantages thereof, will best be understood by reference to the following description taken in connection with the accompanying drawing, in which:

Figure 1:
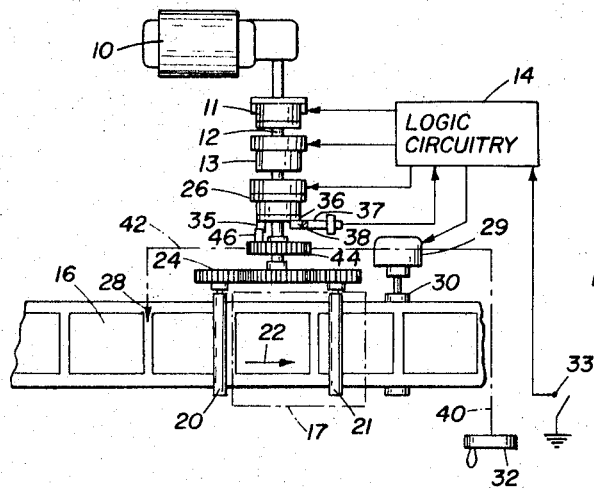
FIG. 1 is a simplified top plan view of one embodiment of our invention.

Referring now to the drawing, wherein like numbers indicate similar parts, we have shown in FIG. 1 a motor 10 couplable by a clutch 11 to a drive shaft 12. In order to control the starting and stopping of the shaft 12 quickly, we have also provided a brake means 13. We prefer, because of inertia problems, that the motor 10 be continuously rotating and that both the clutch 11 and the brake 13 be of types, such as magnetic, which respond quickly to control signals received from logic circuitry 14. The logic circuitry of this invention is relatively straight forward and need not be described in detail herein, using various interlocking electric elements such as switches, "and" gates, relays and the like to obtain control signals as discussed below. Several such logic circuit elements are well within the present state of the art.

In FIG. 1 we have also shown a portion of a strip of film 16 being presented one frame at a time to a printer box 17 (indicated schematically in phantom lines in FIG. 1). The film strip 16 is moved into the printer box 17 through an input slot 18 (FIG. 2) which is designed to be light tight, and the film leaves the box from a similar slot 19. No light is allowed to enter the box during operation of this invention and the box itself is coated internally with non-reflecting materials as are well known in this art.

Driving of the film strip 16 through the box 17 is accomplished by pairs of driving rollers 20 and 21 which move the film forward along a predetermined path as indicated by arrows 22. Because of the possibility that the film may curl or otherwise be deformed by pushing it through the printing box by the rollers 20, the rollers 20 are used only during the initial framing operations whereupon one of them is released as a result of the film passing between the rollers 21. The film drive rollers are driven by gearing 24 which is coupled to the shaft 12. A metering clutch 26 is also under the control of the logic circuitry 14. The rotor of the clutch 26 is coupled to the shaft 12 and is energized only when it is intended to advance the film strip 16.

FIG. 1 further shows a pointer 28 for selecting the film advance distance, and a drive means 29 which is also under the control of logic circuitry 14 for advancing the photo-sensitive paper. The drive means 29 drives a pair of rollers 30 illustrated in FIG. 1 as beneath and to one side of the rollers 21 for controlling the advance of a printing paper web 31 (FIG. 2) immediately after completion of a printing exposure. Irrespective of the film drive system, the paper drive advances the paper web 31 one complete print length, the length depending on the size print being made rather than the length of the film advance.

Referring again to the film advance arrangement, the pointer 28 is under the control of a hand operable knob 32. When the pointer is properly positioned, a "print" switch 33 is closed to develop a print signal for energizing an element in the logic circuitry 14. By way of example, an element such as a two position print relay (not shown) having several contacts thereon operable to energize the clutches 11 and 26 and to deenergize the brake 13 receives the print signal to advance the film strip 16. The clutch 26 remains energized until a projection 35 on a face plate 36 thereof actuates a stop switch 37 such as a proximity magnetic switch. When energized, the switch 37 develops a signal which changes the state of the logic circuitry 14 to cause the clutches 11 and 26 to be de-energized and the brake 13 to be energized to thus stop the film advance system, with the film and paper properly advanced. The projection 35 comes to rest against a fixed limit stop 38 (FIG. 3) to accurately terminate the film advance. Thus the stop switch 37 and the fixed stop 38 co-operate to form a means for accurately stopping the film strip 16. When the advance is stopped, a print is made in conventional fashion, for example, in response to a one shot unistable delay control device within the logic circuitry 14. In accordance with our invention, proper advance of the film is established prior to printing or even moving the film into printing position, by proper positioning of the pointer 28 at the trailing edge of an image frame following the one being printed.

Figure 3:
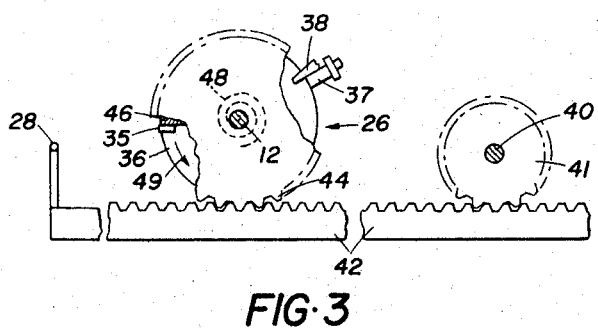
FIG. 3 is a detailed view partially in section of a portion of the driving mechanism shown in FIG. 1.

As shown more clearly in FIG. 3 the hand operable knob (32 of FIG. 1) rotates a shaft 40 and a gear wheel 41 secured thereto to control the position of a rack 42 one end of which supports the pointer 28. By moving the rack 42 the operator controls the position of the pointer 28. The rack 42 also rotates a gear wheel 44 to establish the initial position of the clutch face plate 36 by establishing the position of a movable abutment secured to the gear wheel 44. This abutment 46 engages the projection 35 during its back stroke to establish the starting position of the face plate 36. The face plate 36 is also provided with a spring return means 48 (indicated in dashed lines) which returns the face plate to its starting position upon release of energization of clutch 26. Thus the starting position of the projection 35 is adjustable while the stop switch 37 and the stop 38 are in fixed locations. The arcuate distance between these limits establishes the stroke of the face plate 36 for providing the pre-selected framing of each film negative. The gear ratios are selected so that the face plate 36 has a total movement which corresponds to that required to advance the film strip 16 from its observation position to its print position.

As should now be apparent, the gear wheel 44 is journaled on the shaft 12 so that it is coaxial with the face plate 36. Also the face plate 36 is not secured to the shaft 12 and rotates independently when the clutch 26 is released. On the other hand, the rotor portion of the clutch 26 is secured to the shaft 12 and rotates the face plate 36 during energization of the clutches 11 and 26.

In summary of the general operation of our invention, the shaft 12 rotates in the direction 49 an amount corresponding to the movement of the film strip 16 while the face plate 36 rotates an amount equal to the angular distance between the abutment 46 and the stop 38 and corresponding to that movement necessary to properly advance each individual image frame on the film strip in accordance with the setting of the pointer 28. Movement of the pointer 28 into alignment with the trailing edge of each film image establishes the position of the start position abutment 46 so as to cause advance of the film strip 16 to properly position that edge in the printer box 17. Advance of the paper web 31 is separately effected by the drive means 29 in response to the termination of each print cycle. Advance of the photographic paper is controlled in accordance with the size of the prints being made, rather than the spacing of the images on the film 16. 16.

Referring again to FIG. 2, we have shown the film driving rollers 20 and 21 in greater detail with a switch 50 positioned to sense the passage of the film 16 between rolelrs 21 to thereby energize a solenoid 51 to remove one of the rollers 20 from the film 16. Also, driving of the entire film strip 16 will, of course, include drive means (not shown) coupled to a supply reel 52 and a take-up reel 53 to maintain "dancer" loops 54 and 55 between usual loop sensing devices 56 and 57 respectively such as feeler switches or photodetectors whereby the driving of the film strip by rollers 21 is not affected by the mass of the film on the supply and take-up reels.

Figure 2:
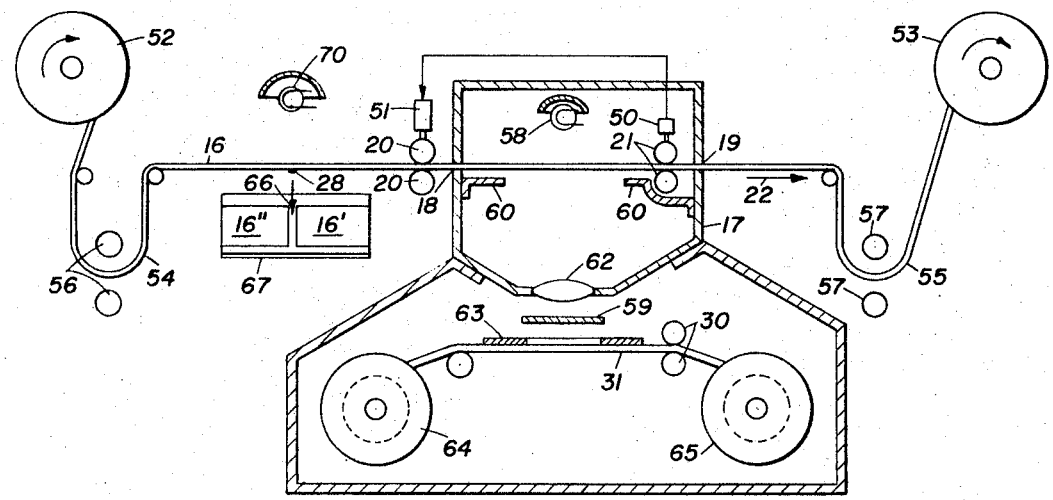
FIG. 2 is a simplified elevation view partially in section of a portion of the mechanism shown in FIG. 1.

Also shown in FIG. 2 is a lamp 58 which illuminates each frame of the film strip 16 when the film strip is stopped by the drive system in a masked aperture defining member or mask 60. A shutter 59 is opened to make a print on the paper 31. The mask 60 is sized in accordance with the particular type film, such as 620, being processed. Also the edge nearest the pointer 28 is referred to hereinafter as the trailing edge of the mask 60. A lense 62 focuses the image of the film strip 16 on the paper web 31 through a corresponding mask 63. The dimension of the mask 63 corresponds to the effective stroke of the paper drive means 29 for advancing the printing paper 31 between a supply reel 64 to a take-up roll 65. Dancer loops, not shown, may also be maintained in the paper web drive system.

As discussed in connection with FIGS. 1 and 3, the control knob 32 establishes the location of the pointer 28. During driving of the pointer 28, its image 66 (FIG. 2) is viewed in a mirror 67 something like what is often referred to as a reflex viewing system, with illumination thereof being provided by a lamp 70. As the light from the lamp 70 also passes through the film strip 16, at least part of the images 16' and 16" are also viewed in the mirror 67. During usual operation of our invention the image 16' is the next in sequence to the one within the masking means 60. Thus, the distance of movement of the film strip 16 corresponds to that between the pointer 28 and the nearest edge of the mask 60.

As should now be apparent, the present invention greatly increases printer speed as all alignment and negative classification may be accomplished during the printing of a prior print rather than between each printing operation as is common in prior art devices.

While we have shown a particular embodiment of this invention, modifications thereof will occur to those skilled in this art. We intend, therefore, to have the appended claims cover such embodiments as properly fall within the scope of the present invention.

We claim:
1. A film metering device for advancing a film strip along a predetermined path to a printing location comprising:
   a pointer positionable along the predetermined path according ot the location of a trailing edge of a frame of the film strip prior to its advance to the printing location;
   means for positioning said pointer;
   metering rollers drivable to advance the film toward said location;
   roller drive means;
   a stop switch;
   a member drivable between a first position and a second position during film advancing by said metering rollers, for operating said stop switch upon reaching said second position;
   means coupled to said pointer and under the control of said positioning means for determining the first position of said member; and
   means responsive to operation of said stop switch for de-energizing said roller drive means and for causing said member to return to the first position.
2. A film metering means as in claim 1 including a fixed member at said second position arranged to limit the maximum advance position of said member and thus precisely terminate the advance thereof.
3. A film metering device as in claim 1 including a photographic printer means having a predetermined masking means such that said metering rollers drive the film a distance along the predetermined path corresponding to that between said pointer and the nearest edge of the masking means;
   paper driving means for moving a strip of photosensitive paper a distance providing an unexposed region thereof; and
   lens means between the masking means and the unexposed region of the paper for focusing a masked image from said film on that region.
4. A film metering device as in claim 3 including illuminating means and reflex viewing means for said pointer during positioning thereof, said printer means being arranged so that the paper is not illuminated by said illuminating means whereby the positioning of the pointer may be accomplished during a printing cycle.
5. A film meterng device as in claim 1 including a drive shaft continuously coupled to said metering rollers and coupled to said member only when said shaft is being driven in film-advancing direction.

6. A film metering device as in claim 1 having a rack coupling said pointer to a control knob and to said means for determining the first position of said member.

7. A film metering device for moving a film along a predetermined path in predetermined steps, comprising:
a negative framing mask at a terminal position of the film path for defining a printing illumination region;
pointer means positionable along the film path to indicate the film length distance between a portion of said mask and a corresponding portion of a next negative image to be presented to said mask;
means for illuminating said pointer means during a print cycle; and
metering rollers operable in accordance with the positioning of said pointer means to advance the film length distance.

8. A film metering device as in claim 7 including:
a stop means for causing the termination of advance of said metering rollers;
a stop switch adjacent to said stop means;
an operating member drivable in accordance with rotation of said metering rollers between a first position and a second position for energizing said stop switch means;
limit control means coupled to said pointer means for determining one of the terminal positions of said operating member; and
means responsive to said first stop switch means for returning said operating member to the first position.

9. A film metering device as in claim 8 including a printer means associated with said mask such that said metering rollers drive the film into said printer means;
paper driving means for moving a strip of photosensitive paper a predetermined distance;
lens means between said mask and the paper for focusing a masked image on an unexposed portion of the paper; and
means for preventing exposure of the paper by said pointer illuminating means.

10. A film metering device as in claim 8 including a drive shaft continuously coupled to said metering rollers and coupled to said operating member only when said shaft is being driven in a film advancing direction.

11. A film metering device as in claim 8 having a rack coupling said pointer means to a control knob and to said limit control means for determining the first position thereof.

12. A film metering device for moving a film strip through a predetermined path in a step by step mode, comprising:
a negative framing mask for defining image illumination;
pointer means for indicating the film length distance between a trailing edge of said mask and a corresponding edge of a next negative image to be presented to a said mask;
film drive means drivable to advance the film a preselected distance in accordance with the positioning of said pointer means;
stop means for causing the termination of advance of said drive means;
an operating member drivable in accordance with driving of said drive means between a first position and a second position;
limit control means coupled to said pointer means for determining one of the positions of said operating member; and
means responsive to said stop means for returning said operating member to the first position.

13. A film metering device as in claim 12 including:
paper driving means for moving a strip of photosensitive paper a print length distance after each exposure;
illuminating means for projecting the image of the film in said mask on an unexposed region of the paper; and
other means for illuminating said pointer means to facilitate its positioning during the projection printing of a previously classified image.

References Cited

UNITED STATES PATENTS

| | | | |
|---|---|---|---|
| 2,541,013 | 2/1951 | Clutz | 226—141 |
| 2,984,012 | 5/1961 | Groll | 33—132 |

NORTON ANSHER, *Primary Examiner.*

R. A. WINTERCORN, *Assistant Examiner.*